United States Patent
Wang et al.

(10) Patent No.: US 9,237,293 B2
(45) Date of Patent: Jan. 12, 2016

(54) REMOTE CONTROL SYSTEM, REMOTE CONTROLLER, DISPLAY DEVICE AND REMOTE CONTROL METHOD

(71) Applicant: Xiaomi Inc., Beijing (CN)

(72) Inventors: Chuan Wang, Beijing (CN); Xijie Shen, Beijing (CN); Zhaopeng Cheng, Beijing (CN); Yongjian Sun, Beijing (CN); Chuangqi Li, Beijing (CN); Jun Wan, Beijing (CN); Yi Ru, Beijing (CN); Feng Li, Beijing (CN); Xing Yan, Beijing (CN); Qingsong Dai, Beijing (CN)

(73) Assignee: Xiaomi Inc., Beijing (CN)

( * ) Notice: Subject to any disclaimer, the term of this patent is extended or adjusted under 35 U.S.C. 154(b) by 43 days.

(21) Appl. No.: 14/293,462

(22) Filed: Jun. 2, 2014

(65) Prior Publication Data

US 2015/0062442 A1    Mar. 5, 2015

Related U.S. Application Data

(63) Continuation of application No. PCT/CN2014/072284, filed on Feb. 20, 2014.

(30) Foreign Application Priority Data

Aug. 30, 2013   (CN) .......................... 2013 1 0390610

(51) Int. Cl.
*H04N 5/44* (2011.01)
*H04N 21/422* (2011.01)
*H04N 21/482* (2011.01)

(52) U.S. Cl.
CPC ....... *H04N 5/4403* (2013.01); *H04N 21/42228* (2013.01); *H04N 21/4826* (2013.01)

(58) Field of Classification Search
CPC ....................................................... H04N 5/44
USPC .......................................................... 348/734
See application file for complete search history.

(56) References Cited

U.S. PATENT DOCUMENTS

| | | | | |
|---|---|---|---|---|
| 5,949,351 A | * | 9/1999 | Hahm | G08C 23/04 340/12.55 |
| 7,937,733 B2 | | 5/2011 | Katayama et al. | |

(Continued)

FOREIGN PATENT DOCUMENTS

| | | |
|---|---|---|
| CN | 101047805 | 10/2007 |
| CN | 101141581 | 3/2008 |

(Continued)

OTHER PUBLICATIONS

International Search Report of PCT/CN2014/072284, mailed from the State Intellectual Property Office of China on May 26, 2014.

*Primary Examiner* — Paulos M Natnael
(74) *Attorney, Agent, or Firm* — Finnegan, Henderson, Farabow, Garrett & Dunner LLP

(57) ABSTRACT

A remote control system, including: a remote controller including one or more direction keys respectively corresponding to different directions and a confirm key; and a display device controlled by the remote controller; wherein: the remote controller is configured to transmit a direction control signal of a corresponding direction to the display device when one of the direction keys is pressed; and the display device is configured to, when the direction control signal is received by the display device in a first state of displaying sub-level content without displaying a card directory and corresponds to a predetermined direction, switch to a second state of displaying a card directory, the card directory including one selected card and at least one candidate card arranged in order, and at least one switch direction.

23 Claims, 20 Drawing Sheets

(56) References Cited

U.S. PATENT DOCUMENTS

| | | | | |
|---|---|---|---|---|
| 8,313,379 B2* | 11/2012 | Ikeda | ............ | A63F 13/02 |
| | | | | 345/158 |
| 8,525,803 B2* | 9/2013 | Lee | ............ | H04N 21/42224 |
| | | | | 345/173 |
| 2007/0205991 A1* | 9/2007 | Gloyd | ............ | G06F 1/1626 |
| | | | | 345/169 |
| 2008/0216130 A1 | 9/2008 | Katayama et al. | | |
| 2012/0169935 A1* | 7/2012 | Kim | ............ | G08C 17/02 |
| | | | | 348/569 |
| 2012/0262374 A1* | 10/2012 | Lai | ............ | G08C 17/02 |
| | | | | 345/158 |
| 2014/0028921 A1* | 1/2014 | Moon | ............ | H04N 21/4126 |
| | | | | 348/734 |

FOREIGN PATENT DOCUMENTS

| | | |
|---|---|---|
| CN | 101924891 | 12/2010 |
| CN | 103491405 | 1/2014 |

\* cited by examiner

REMOTE CONTROL SYSTEM, REMOTE CONTROLLER, DISPLAY DEVICE AND REMOTE CONTROL METHOD

CROSS-REFERENCE TO RELATED APPLICATIONS

This application is a continuation of International Application No. PCT/CN2014/072284, filed Feb. 20, 2014, which claims priority to Chinese Patent Application No. 201310390610.2, filed Aug. 30, 2013, the entire contents of all of which are incorporated herein by reference.

TECHNICAL FIELD

The present disclosure generally relates to the field of electronic technology and, more particularly, to a remote control system, a remote controller, a display device and a remote control method.

BACKGROUND

A conventional remote controller for controlling a television generally includes a power key, digital keys 0~9, direction keys, and function keys. A user may need to press a combination of ones of the digital keys when using the remote controller to select a channel. For example, when the user wants to select channel 36, the user needs to press the digital key 3 and the digital key 6 on the remote controller, so as to control the television to switch to channel 36.

SUMMARY

According to a first aspect of the present disclosure, there is provided a remote control system, comprising: a remote controller including one or more direction keys respectively corresponding to different directions and a confirm key; and a display device controlled by the remote controller; wherein: the remote controller is configured to transmit a direction control signal of a corresponding direction to the display device when one of the direction keys is pressed; the display device is configured to, when the direction control signal is received by the display device in a first state of displaying sub-level content without displaying a card directory and corresponds to a predetermined direction, switch to a second state of displaying a card directory, the card directory including one selected card and at least one candidate card arranged in order, and at least one switch direction; the display device is further configured to, when the direction control signal is received by the display device in the second state and corresponds to a switch direction of the card directory, select a candidate card in the card directory to be the selected card according to the switch direction; the remote controller is further configured to transmit a confirm signal to the display device when the confirm key is pressed; and the display device is configured to, when receiving the confirm signal in the second state, switch to the first state of displaying sub-level content corresponding to the selected card without displaying the card directory.

According to a second aspect of the present disclosure, there is provided a remote controller for controlling a display device, comprising: one or more direction keys respectively corresponding to different directions and a confirm key; a control chip electrically connected to the one or more direction keys and the confirm key; and a transmitter electrically connected to the control chip; wherein the control chip is configured to control the transmitter to transmit a direction control signal of a corresponding direction to the display device to: when the direction control signal is received by the display device in a first state of displaying sub-level content and corresponds to a predetermined direction, cause the display device to switch to a second state of displaying a card directory, the card directory including one selected card and at least one candidate card arranged in order, and at least one switch direction; and when the direction control signal is received by the display device in the second state and corresponds to a switch direction of the card directory, cause the display device to select a candidate card in the card directory to be the selected card according to the switch direction; and the control chip is further configured to control the transmitter to transmit a confirm signal to the display device to, when the confirm signal is received by the display device in the second state, switch the display device to the first state of displaying sub-level content corresponding to the selected card.

According to a third aspect of the present disclosure, there is provided a display device, comprising: a receiver; a control chip electrically connected to the receiver; and a display assembly electrically connected to the control chip; wherein: the receiver is configured to receive a direction control signal or a confirm signal transmitted by a remote controller; the control chip is configured to, when the display assembly is in a first state of displaying sub-level content without displaying a card directory and the direction control signal received by the receiver corresponds to a predetermined direction, control the display assembly to switch to a second state of displaying a card directory, the card directory including one selected card and at least one candidate card arranged in order, and at least one switch direction; the control chip is further configured to, when the display assembly is in the second state and the direction control signal received by the receiver corresponds to a switch direction of the card directory, control the display assembly to select a candidate card in the card directory to be the selected card according to the switch direction; and the control chip is further configured to, when the display assembly is in the second state and the receiver receives the confirm signal, control the display assembly to switch to the first state of displaying sub-level content corresponding to the selected card without displaying the card directory.

According to a fourth aspect of the present disclosure, there is provided a method for a display device to be controlled by a remote controller, comprising: receiving a direction control signal or a confirm signal transmitted by the remote controller; when the direction control signal is received by the display device in a first state of displaying sub-level content without displaying a card directory and corresponds to a predetermined direction, switching to a second state of displaying a card directory, the card directory including one selected card and at least one candidate card arranged in order, and at least one switch direction; when the direction control signal is received by the display device in the second state and corresponds to a switch direction of the card directory, selecting a candidate card in the card directory to be the selected card according to the switch direction; and when the confirm signal is received by the display device in the second state, switching to the first state of displaying sub-level content corresponding to the selected card.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodi

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
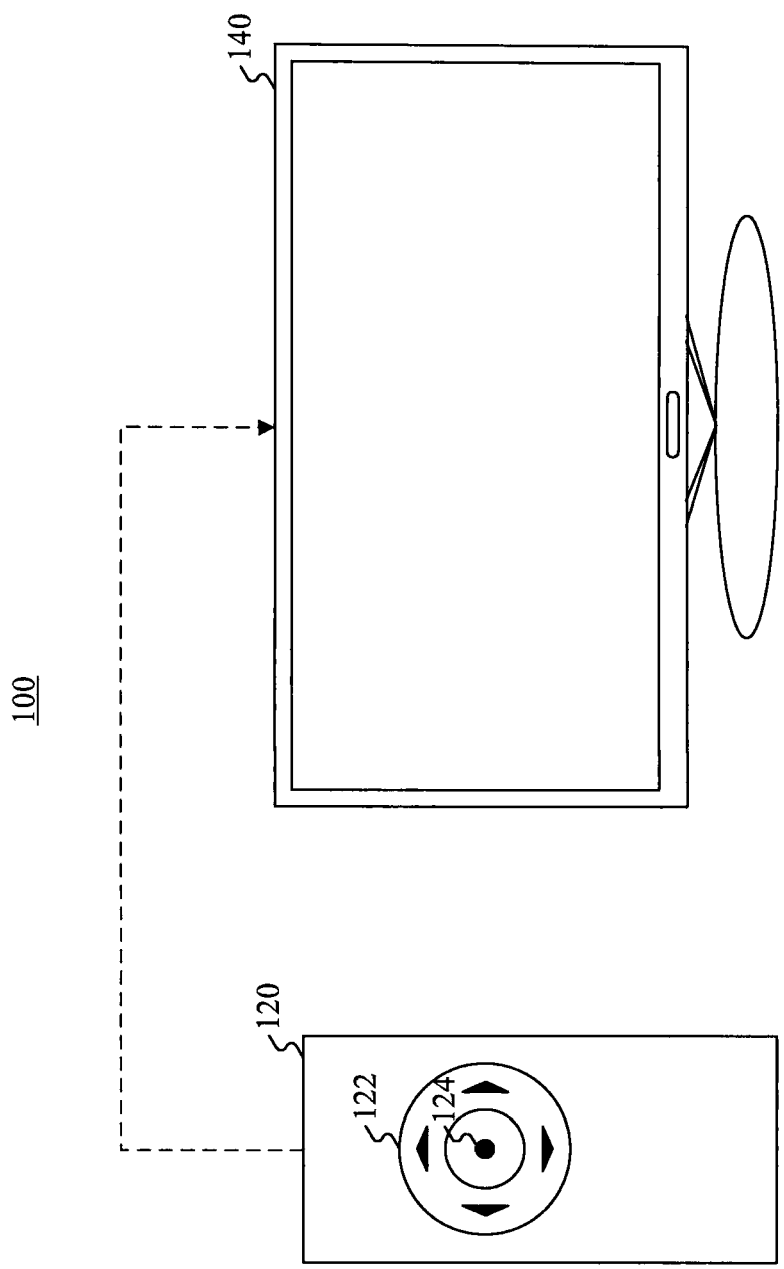
- FIG. 1 is a schematic diagram of a remote control system, according to an exemplary embodiment.

FIG. 1 illustrates a schematic diagram of a remote control system 100, according to an exemplary embodiment. Referring to FIG. 1, the remote control system 100 includes a remote controller 120 and a display device 140 controlled by the remote controller 120. The remote controller 120 includes one or more direction keys 122 respectively corresponding to different directions and a confirm key 124.

In exemplary embodiments, when one of the direction keys 122 is pressed, the remote controller 120 transmits a direction control signal of a corresponding direction to the display device 140. When the display device 140 receives the direction control signal in a first state of displaying sub-level content without displaying a card directory, the display device 140 switches to a second state of displaying the card directory. For example, the card directory includes a selected card and at least one candidate card arranged in order, and at least one switch direction, as described below. When the display device 140 receives the direction control signal in the second state, the display device 140 switches to displaying a candidate card in the card directory being selected according to the switch direction.

Figure 2A:
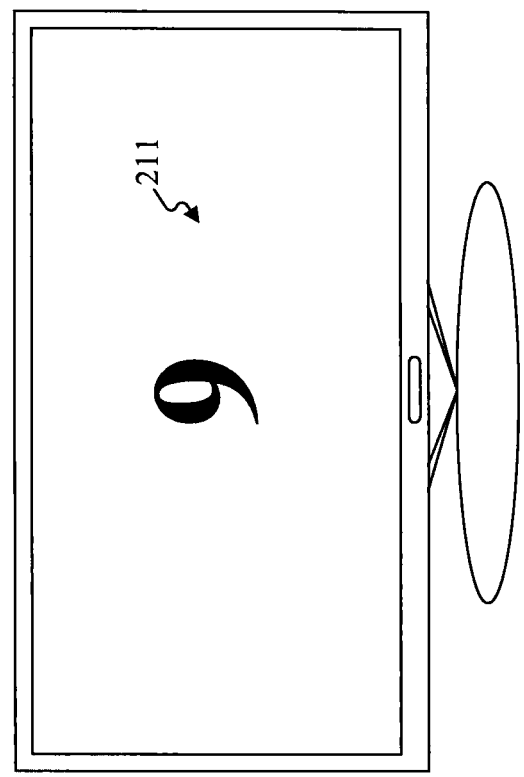
FIGS. 2A-2D are diagrams of interfaces displayed on a display device, according to exemplary embodiments.
Figure 2B:
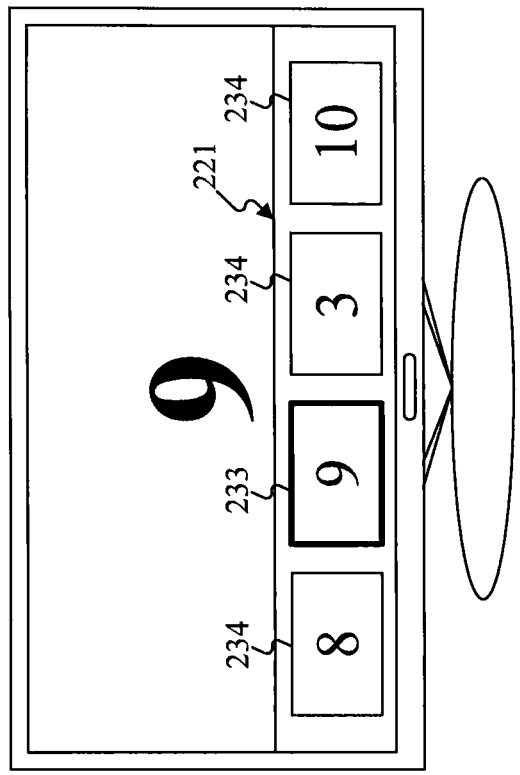
Figure 2C:
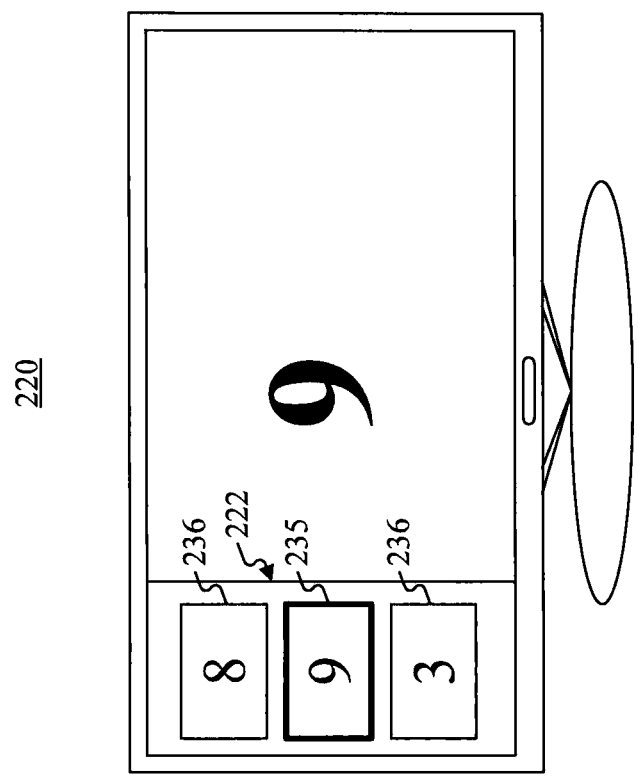
Figure 2D:
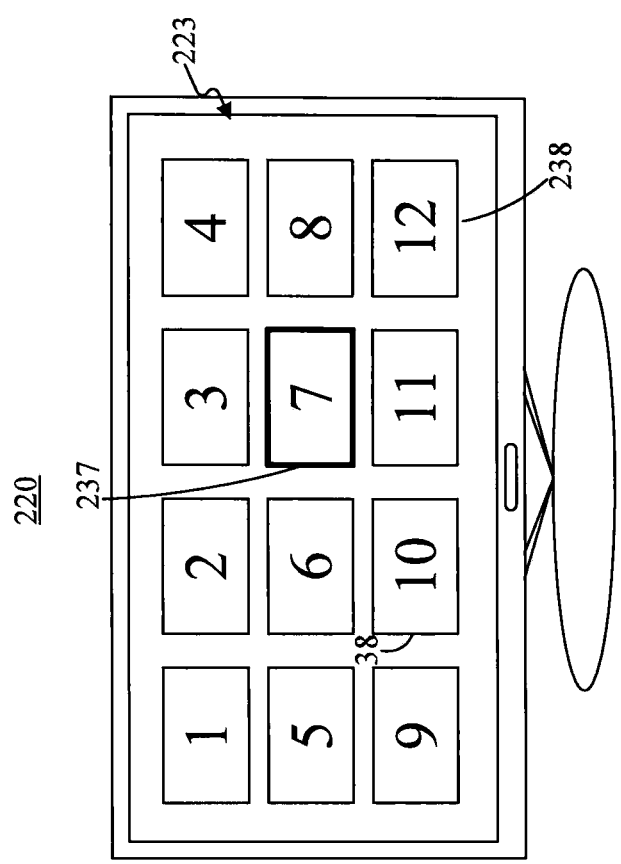

For example, FIG. 2A is a diagram of an interface 210 displayed on a display device in the first state, and FIGS. 2B, 2C, and 2D are diagrams of interfaces 220 displayed on the display device in the second state, according to exemplary embodiments. FIGS. 2A-2D will be further described below.

Referring back to FIG. 1, in exemplary embodiments, the remote controller 120 transmits a confirm signal to the display device 140 when the confirm key 124 is pressed. When the display device 140 receives the confirm signal in the second state, the display device 140 switches to the first state of displaying the sub-level content corresponding to the selected card without displaying the card directory.

In the illustrated embodiment, the operation of switching among different sub-level contents can be achieved by the direction keys 122 and the confirm key 124 on the remote controller 120 without using of any digital keys, which can simplify and improve efficiency of user input. In addition, the remote controller 120 can be made small, light, and thin, which will save manufacturing cost. In other embodiments, the remote controller 120 may also include digital keys.

Figure 3:
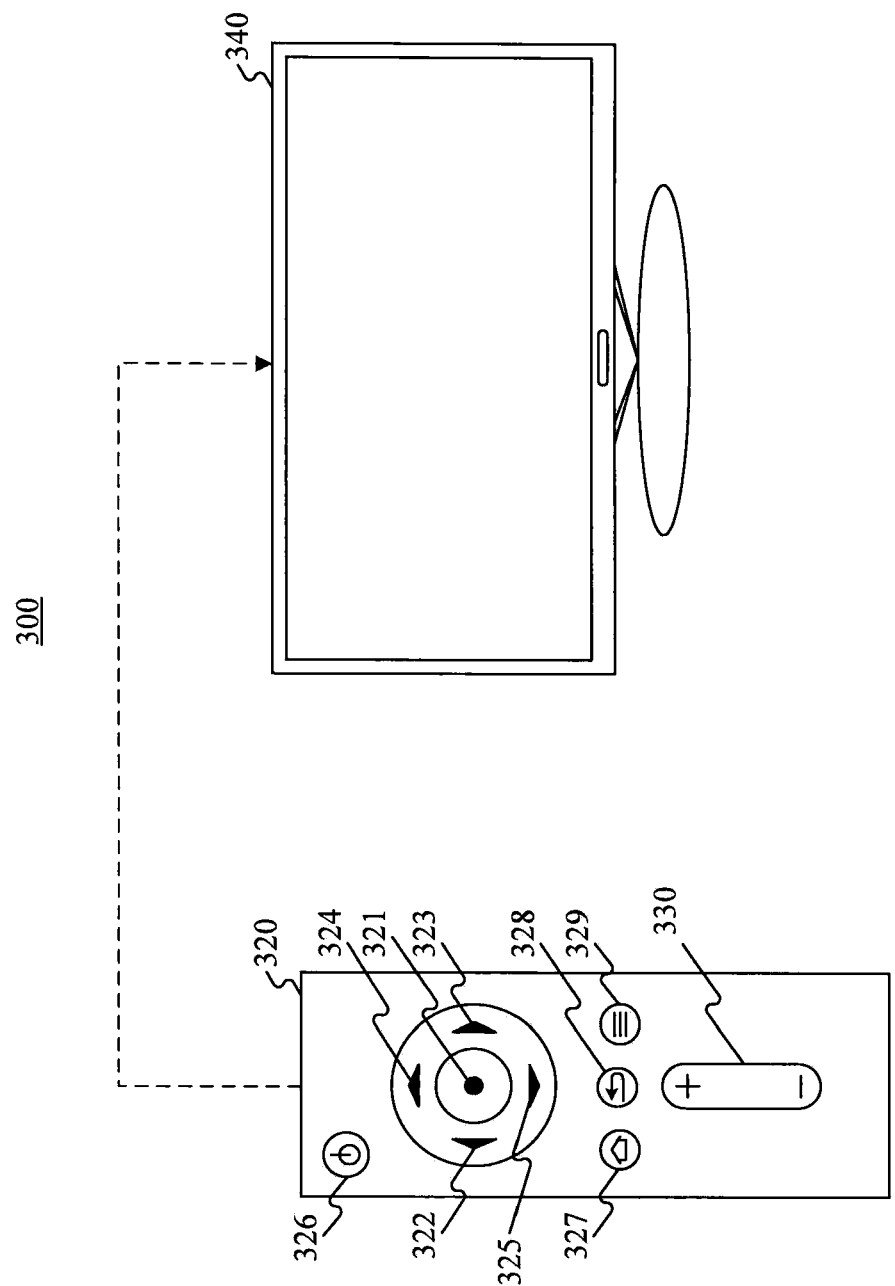
FIG. 3 is a schematic diagram of a remote control system, according to an exemplary embodiment.

FIG. 3 illustrates a schematic diagram of a remote control system 300, according to an exemplary embodiment. Referring to FIG. 3, the remote control system 300 includes a remote controller 320 and a display device 340 controlled by the remote controller 320. For example, the remote controller 320 may not include digital keys, and the display device 340 may be a smart TV.

In exemplary embodiments, the remote controller 320 includes one or more direction keys respectively corresponding to different directions and a confirm key 321. For example, the direction keys include a left direction key 322, a right direction key 323, an up direction key 324, and a down direction key 325. These four direction keys may be annularly distributed on a surface of the remote controller 320, and the confirm key 321 is positioned at a center of these four direction keys. In some embodiments, a number of the direction keys may be different. For example, the number of the direction keys may be 2 or 8, etc. The remote controller 320 may optionally include one or more of a power key 326 to power on the display device 340, a home key 327 to control the display device 340 to display a desktop, a return key 328 to control the display device 340 to return to a previous operation, a menu key 329 to control the display device to display a menu, or a volume key 330 to control volume of the display device 340.

In some embodiments, the remote controller 320 does not include the power key 326 and the home key 327. Accordingly, powering on the display device 340 may be accomplished by long pressing the confirm key 321, and switching the display device 340 to displaying the desktop may be accomplished by double clicking the confirm key 321. In some embodiments, the remote controller 320 does not include the menu key 329 and the power key 326. Functions of the menu key 329 and the power key 326 may be accomplished by pressing a combination of ones of the direction keys, long pressing the confirm key 321, or repeatedly clicking the confirm key 321, etc.

In some embodiments, the display device 340 is a smart TV which communicates with the remote controller 320 through wireless communication technology, such as infrared technology, Bluetooth technology, Wireless Fidelity (WiFi) technology, or ZigBee technology. In some embodiments, the display device 340 is a desktop computer, a notebook computer, a tablet computer, or an all-in-one machine, etc.

In exemplary embodiments, the remote controller 320 transmits a direction control signal of a corresponding direction to the display device 340 when a direction key is pressed. For example, when the left direction key 322 is pressed, the remote controller 320 transmits a direction control signal of a left direction to the display device 340; when the right direction key 323 is pressed, the remote controller 320 transmits a direction control signal of a right direction to the display device 340; when the up direction key 324 is pressed, the remote controller 320 transmits a direction control signal of an up direction to the display device 340; and when the down direction key 325 is pressed, the remote controller 320 transmits a direction control signal of a down direction to the display device 340.

In exemplary embodiments, when the display device 340 receives the direction control signal in a first state of displaying sub-level content without displaying a card directory, the display device 340 switches to a second state of displaying the card directory. For example, the card directory includes a selected card and at least one candidate card arranged in order, and at least one switch direction. The sub-level content may be any content that can be selected through the card directory.

FIG. 2A is a diagram of an interface 210 displayed on the display device 340 (FIG. 3) in the first state, according to an exemplary embodiment. In the first state, the display device 340 displays sub-level content 211 without displaying a card directory. The sub-level content 211 may be content from a particular TV channel, e.g. channel 9, a local high definition play resource, an interface of an application store, or an interface of a game center, etc.

FIGS. 2B, 2C, and 2D are diagrams of interfaces 220 displayed the display device 340 in the second state, according to exemplary embodiments. In the second state, the display device 340 displays a card directory, which may be any one of a lateral card directory 221 shown in FIG. 2B, a vertical card directory 222 shown in FIG. 2C, or an array card directory 223 shown in FIG. 2D. The display device 340 may directly display the card directory when it is powered on or, when the display device 340 is displaying sub-level content, displays the card directory being superimposed on the currently displayed sub-level content.

In exemplary embodiments, the lateral card directory 221 (FIG. 2B) includes a selected card 233 and at least one candidate card 234 arranged in a predetermined order, and switch directions of the lateral card directory 221 include a left direction and/or a right direction. In the embodiment illustrated in FIG. 2B, the switch directions include both the left direction and the right direction.

In exemplary embodiments, the vertical card directory 222 (FIG. 2C) includes a selected card 235 and at least one candidate card 236 arranged in a predetermined order, and switch directions of the vertical card directory 222 include an up direction and/or a down direction. In the embodiment illustrated in FIG. 2C, the switch directions include both the up direction and the down direction.

In exemplary embodiments, the array card directory 233 (FIG. 2D) includes a selected card 37 and at least two candidate cards 238 arranged in a predetermined order, and switch directions of the array card directory 223 includes at least two directions perpendicular to each other among the left direction, the right direction, the up direction, and the down direction. In the embodiment illustrated in FIG. 2D, the switch directions include all of the left direction, the right direction, the up direction, and the down direction.

In exemplary embodiments, each card occupies an area of the display interface, and may be rectangular, circular, square, round-corner rectangular, or other geometric shape. Each card corresponds to one sub-level content. For example, content on each TV channel is one sub-level content and corresponds to one card. Also for example, content received through each hardware interface of the display device 340 is one sub-level content and corresponds to one card, and the sub-level content of each card may be provided by a local high definition player. Information displayed on each card may include introduction information of the sub-level content, a channel number, a channel name, and a program name, the introduction information including a poster picture and/or literal description.

In exemplary embodiments, a card directory may use different predetermined orders for cards in the card directory. For example, the card directory may use an order according to a time sequence of viewing history where, e.g., the cards from left to right in the card directory correspond to sub-level contents viewed from more recently to less recently. Also for example, the card directory may use an order according to a number of times being viewed where, e.g., the cards from left to right in the card directory correspond to sub-level contents viewed from more times to fewer times. Further for example, the card directory may use an order according to a number of times of being marked where, e.g., the cards from left to right in the card directory correspond to sub-level contents marked from more times to fewer times. As another example, the card directory may use an order according to the channel numbers of sub-level contents where, e.g., the cards from left to right in the card directory correspond to sub-level contents from a smaller channel number to a larger channel number. In this example, the interface displayed on the display device 340 may be divided into a plurality of rectangular display subareas each having a predetermined size, to respectively display preview contents corresponding to different channels, and the preview contents may be a live broadcasting video of a channel or a screenshot thereof.

Figure 4A:
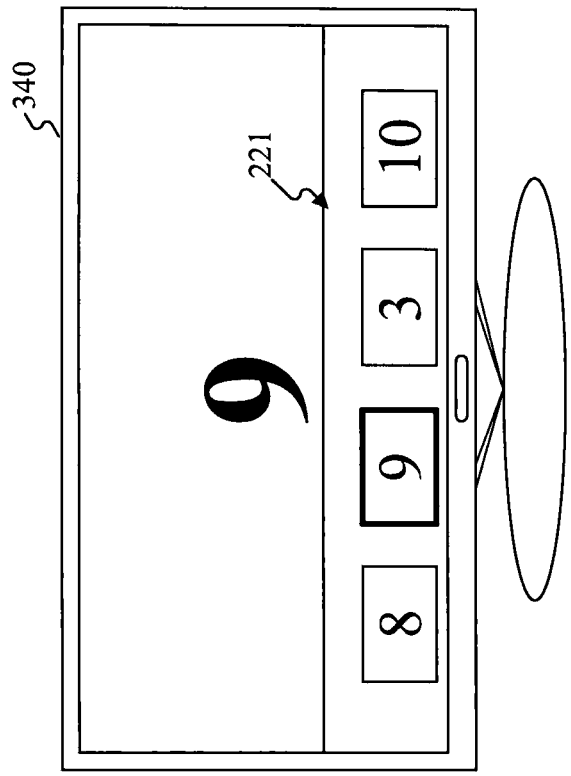
FIGS. 4A-4J are diagrams of interfaces displayed on a display device, according to exemplary embodiments.
Figure 4A:
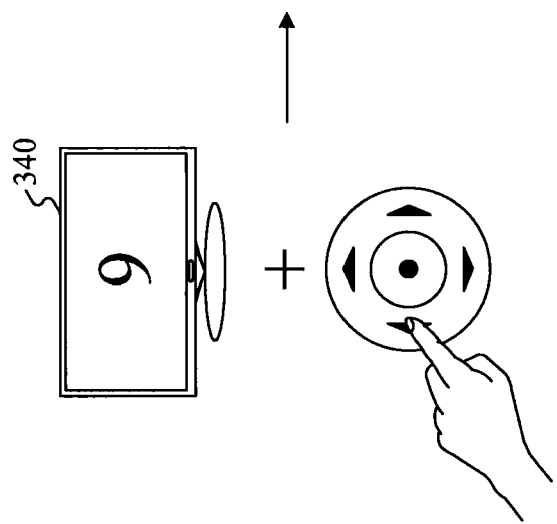

In exemplary embodiments, the display device 340 receives from the remote controller 320 a direction control signal of the left direction and, accordingly, displays the lateral card directory 221. For example, as shown in FIG. 4A, when the display device 340 is in the first state of displaying the sub-level content "TV channel 9" without displaying a card directory, the display device 340 receives the direction control signal of the left direction. Accordingly, the display device 340 switches to the second state of displaying the lateral card directory 221. The lateral card directory 221 may be ordered according to a time sequence of viewing history.

Figure 4B:
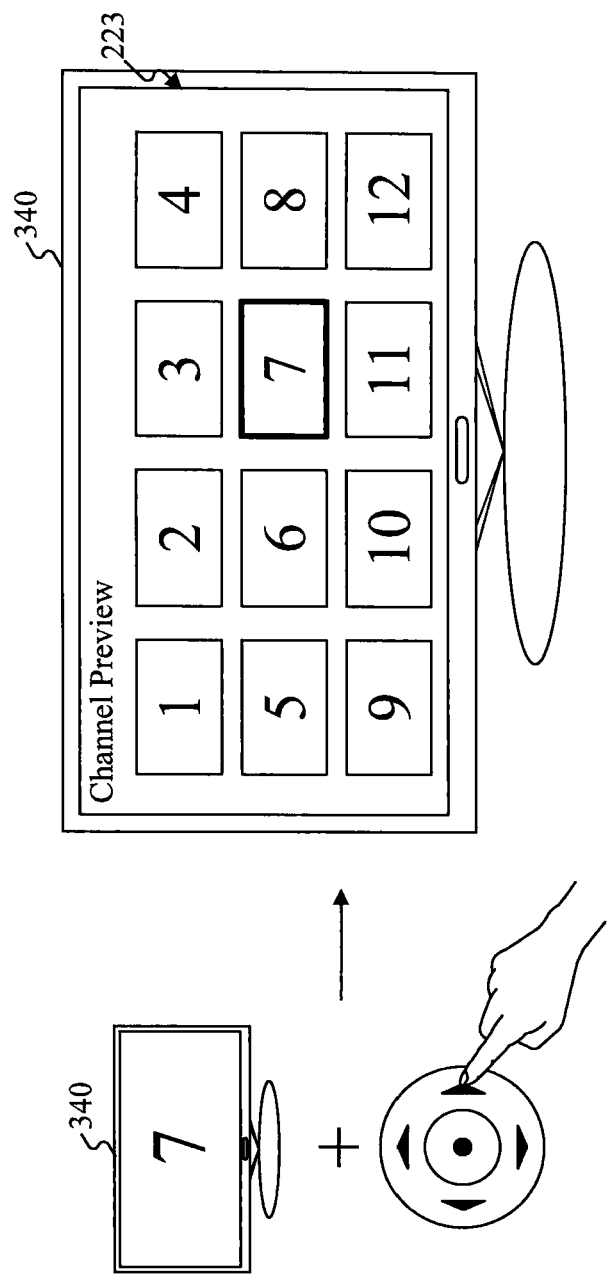

In exemplary embodiments, the display device 340 receives from the remote controller 320 a direction control signal of the right direction and, accordingly, displays the array card directory 223. For example, as shown in FIG. 4B, when the display device 340 is in the first state of displaying the sub-level content "TV channel 7" without displaying a card directory, the display device 340 receives the direction control signal of the right direction. Accordingly, the display device 340 switches to the second state of displaying the array card directory 223. The array card directory 223 may be ordered according to TV channel numbers.

In the above illustrated embodiments, the remote controller 320 is configured to transmit the direction control signal of the left direction and the direction control signal of the right direction. Correspondingly, the display device 340 is configured to switch to the lateral card directory 221 and the array card directory 223, respectively. In other embodiments, the remote controller 320 is configured to transmit a direction control signal of the up direction and a direction control signal of the down direction. Correspondingly, the display device 340 is configured to switch to two different card directories, respectively. In addition, an initially selected card in the card directory may be a predetermined card, or a card corresponding to the currently displayed sub-level content.

In exemplary embodiments, when the display device 340 receives a direction control signal of a switch direction in the second state, the display device 340 selects a candidate card in the card directory to be the selected card according to the switch direction.

Figure 4C:
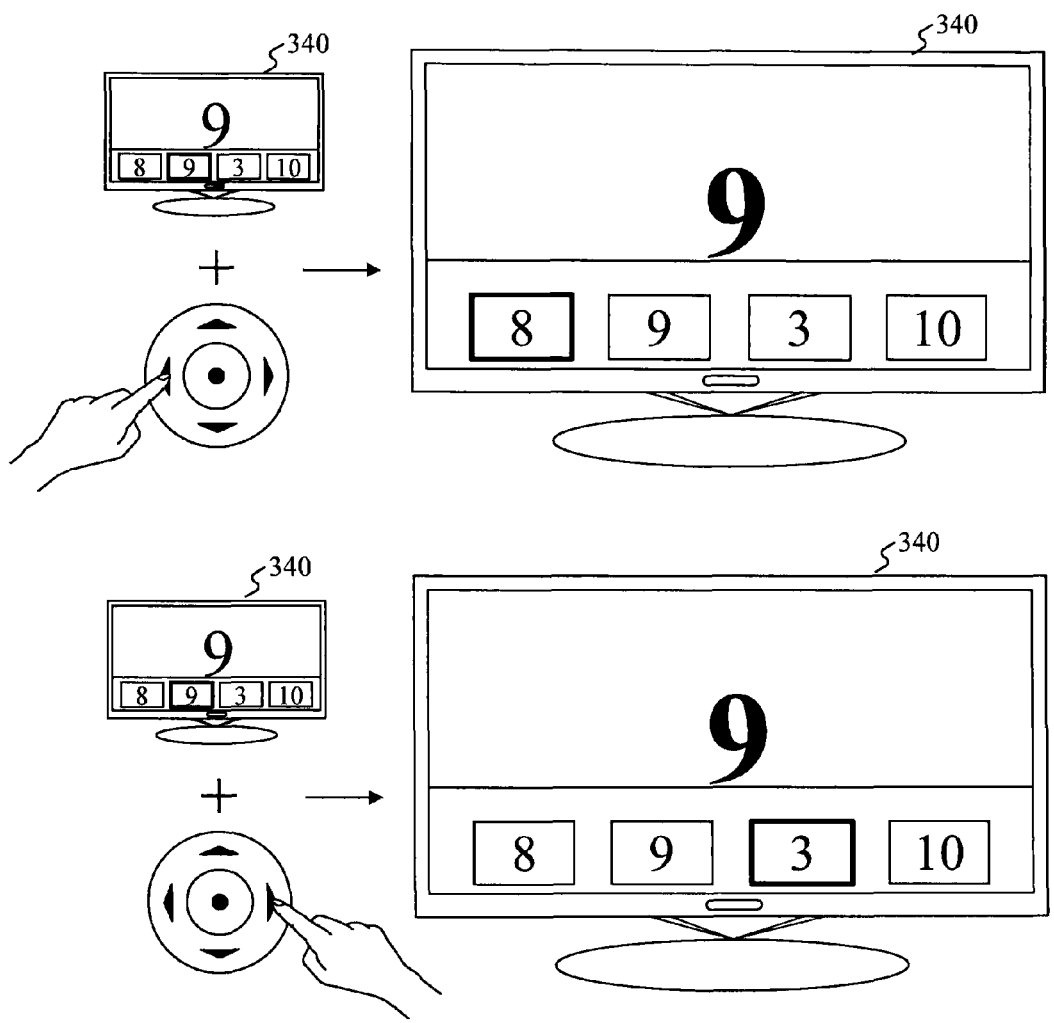

In one exemplary embodiment, the card directory is the lateral card directory 221 as shown in FIG. 4A, and the switch directions include both the left direction and the right direction. Accordingly, as shown in FIG. 4C, when receiving a direction control signal corresponding to the left direction, the display device 340 selects the candidate card corresponding to channel "8", which is located to the left of the currently selected card corresponding to channel "9", to be the selected card according to the switch direction, and switches the currently selected card corresponding to channel "9" to be a candidate card. Alternatively, when receiving a direction control signal corresponding to the right direction, the display device 340 selects the candidate card corresponding to channel "3", which is located to the right of the currently selected card corresponding to channel "9", to be the selected card according to the switch direction, and switches the currently selected card corresponding to channel "9" to be a candidate card.

Figure 4D:
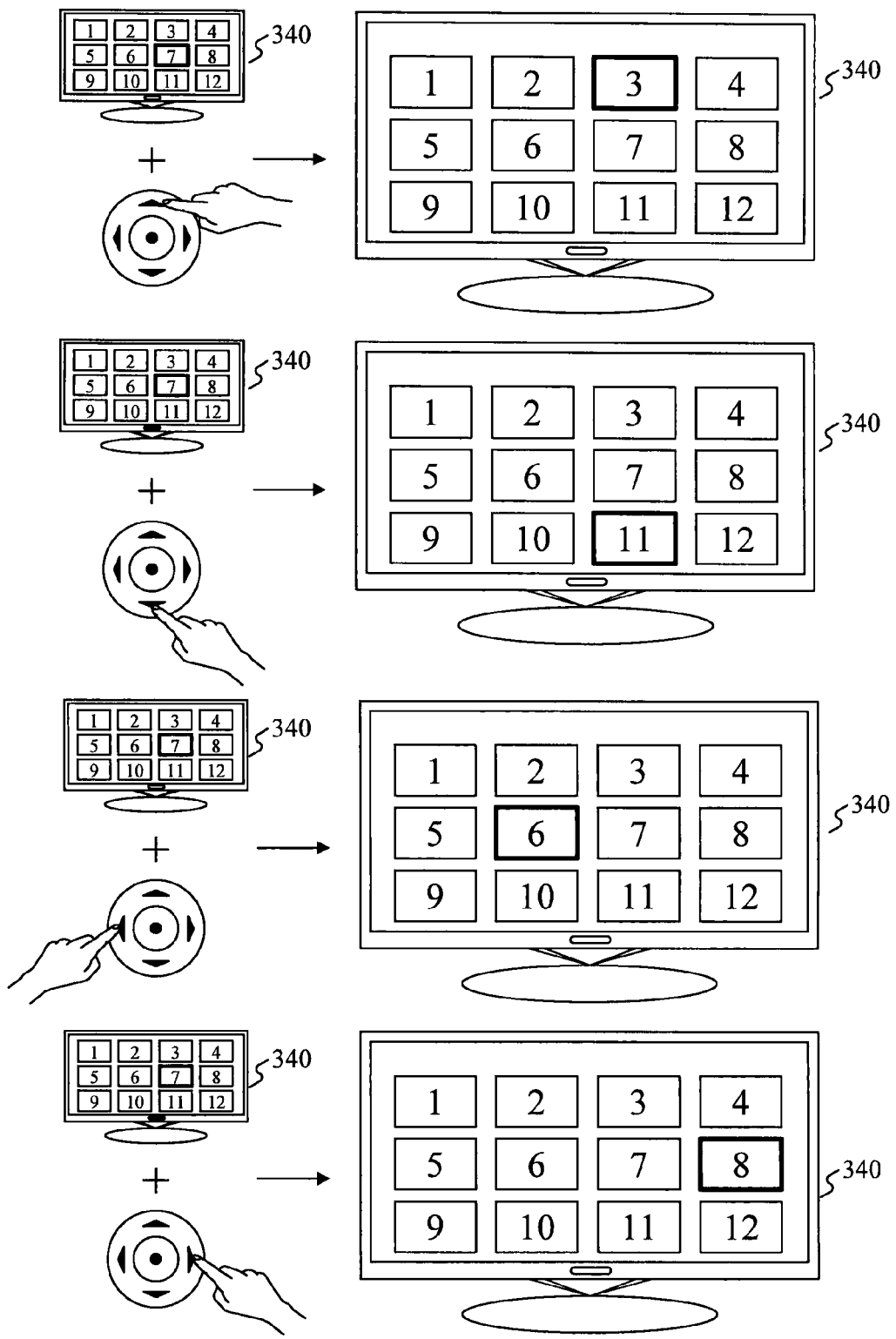

In one exemplary embodiment, the card directory is the array card directory 223 as shown in FIG. 4B, and the switch directions include up, down, left, and right directions. Accordingly, as shown in FIG. 4D, when receiving a direction control signal corresponding to the up direction, the display device 340 selects a candidate card corresponding to channel "3", which is located above the currently selected card corresponding to channel "7", to be the selected card according to the switch direction, and switches the currently selected card corresponding to channel "7" to be a candidate card. Alternatively, when receiving a direction control signal corresponding to the down direction, the display device 340 selects a candidate card corresponding to channel "11", which is located beneath the currently selected card corresponding to channel "7", to be the selected card according to the switch direction, and switches the currently selected card corresponding to channel "7" to be a candidate card. Alternatively, when receiving a direction control signal corresponding to the left direction, the display device 340 selects a candidate card corresponding to channel "6", which is located to the left of the currently selected card corresponding to channel "7", to be the selected card according to the switch direction, and switches the currently selected card corresponding to channel "7" to be a candidate card. Alternatively, when receiving a direction control signal corresponding to the right direction, the display device 340 selects a candidate card "8", which is located to the right of the currently selected card corresponding to channel "7", to be the selected card according to the switch direction, and switches the currently selected card corresponding to channel "7" to be a candidate card.

Sill referring to FIG. 3, in exemplary embodiments, the remote controller 320 is configured to transmit a confirm signal to the display device 340 when the confirm key 321 is pressed. When receiving the confirm signal in the second state, the display device 340 switches to the first state of displaying sub-level content corresponding to the selected card without displaying a card directory.

Figure 4E:
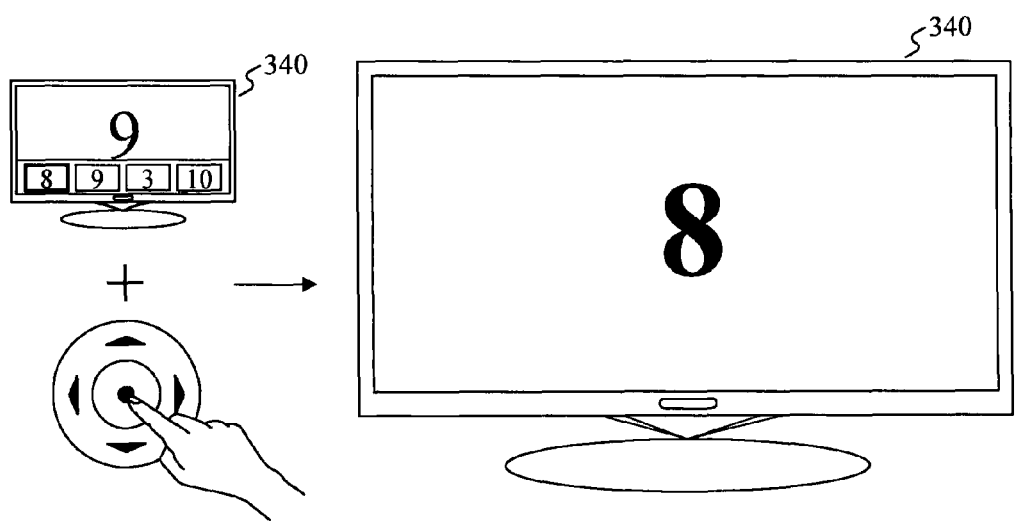

In one exemplary embodiment, the display device 340 is in the second state as shown in the upper figure of FIG. 4C. Accordingly, as shown in FIG. 4E, when receiving the confirm signal, the display device 340 switches to the first state of displaying sub-level content corresponding to the selected card corresponding to channel "8" without displaying a card directory.

In exemplary embodiments, when receiving a direction control signal corresponding to no switch direction in the second state, the display device 340 switches to displaying another card directory, a switch direction or an order of the another card directory being different from that of the current card directory.

Figure 4F:
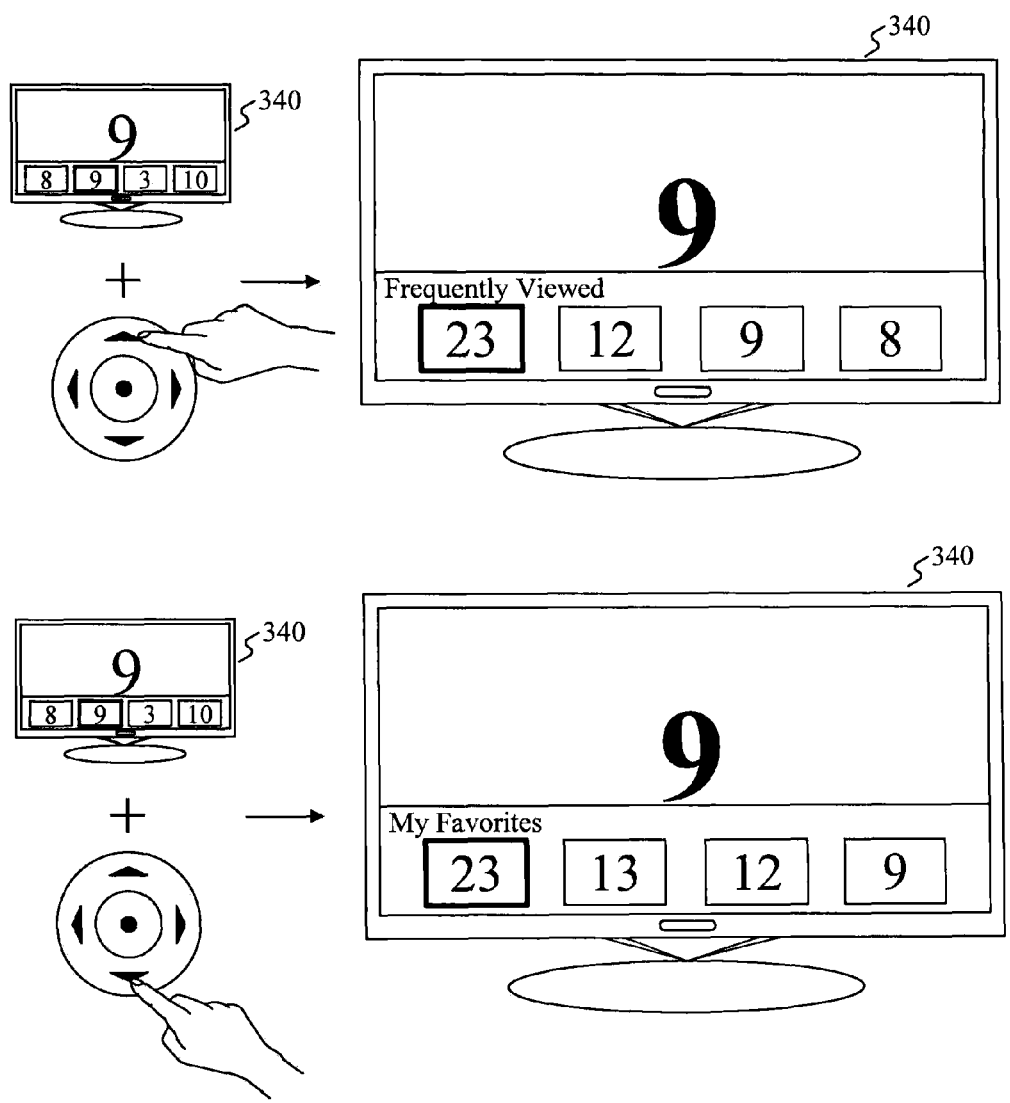

In one exemplary embodiment, the display device 340 displays the lateral card directory 221 as shown in FIG. 4A. Accordingly, as shown in FIG. 4F, when the display device 340 receives a direction control signal of the up direction, which is not a switch direction of the lateral card directory 221, the display device 340 switches to displaying another card directory, which may be a lateral card directory ordered according to a number of times the corresponding sub-level contents are viewed. Similarly, when the display device 340 receives a direction control signal of the down direction, which is also not a switch direction of the lateral card directory 221, the display device 340 switches to displaying another card directory, which may be a lateral card directory ordered according to a number of times the corresponding sub-level contents are marked, as also shown in FIG. 4F.

In exemplary embodiments, if the up direction key or the down direction key is successively pressed for several times, the card directory displayed by the display device 340 may be circularly switched among, e.g., the lateral card directory of "recent watching", the lateral card directory of "frequent watching", and the lateral card directory of "my favorites."

In exemplary embodiments, when receiving a direction control signal not corresponding to a predetermined direction in the first state, the display device 340 directly switches the currently displayed sub-level content to sub-level content corresponding to another card according to the direction control signal and a predetermined card order. For example, the predetermined direction in the first state is the same as a switch direction for the card directory in the second direction.

Figure 4G:
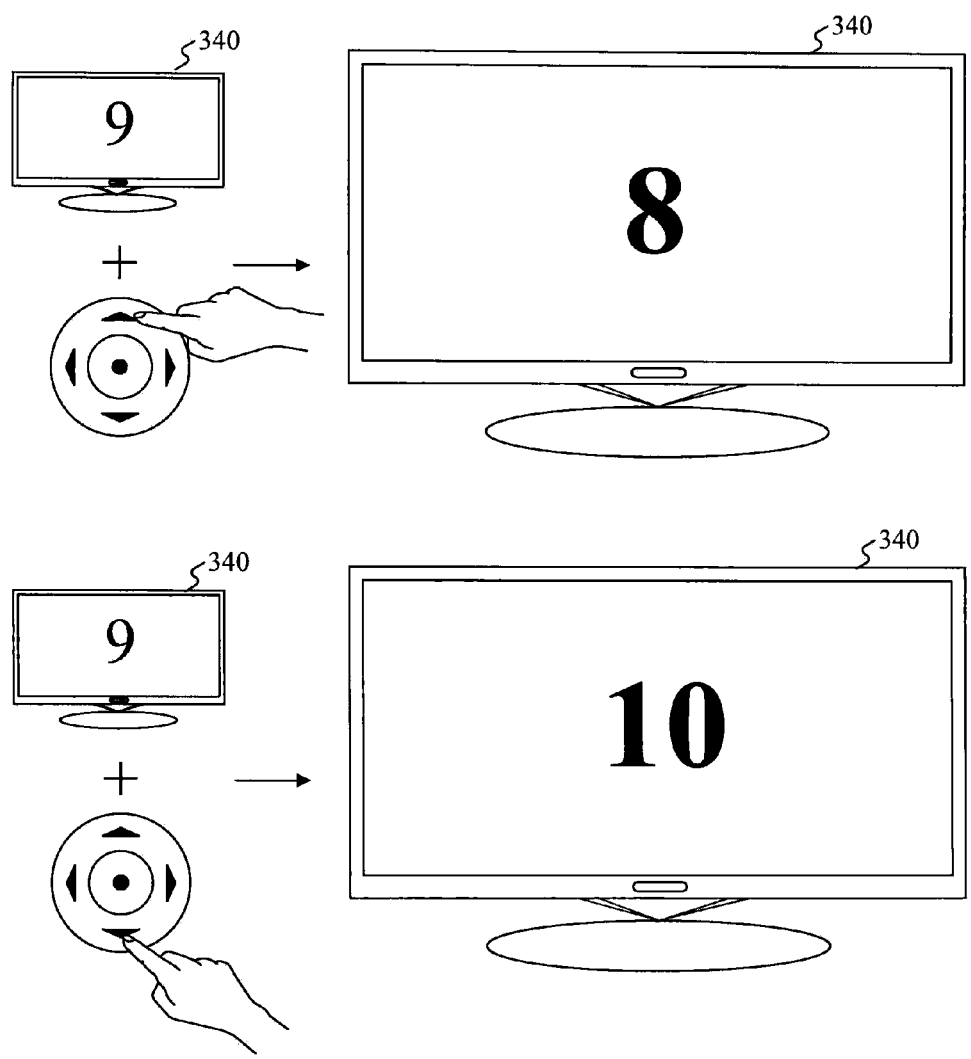

In one exemplary embodiment, the display device 340 is in the first state as shown in FIG. 2A. Accordingly, as shown in FIG. 4G, when the display device 340 receives a direction control signal of the up direction, which is not a predetermined direction in the illustrated embodiment, the display device 340 directly switches the currently displayed sub-level content on channel "9" to the sub-level content, e.g., on channel "8" corresponding to another card according to the direction control signal and a card order based on the channel numbers of sub-level contents. Alternatively, when the display device 340 receives a direction control signal of the down direction, which is not a predetermined direction in the illustrated embodiment, the display device 340 directly switches the currently displayed sub-level content on channel "9" to the sub-level content on, e.g., channel "10" corresponding to another card according to the direction control signal and a card order based on the channel numbers of sub-level contents, as also shown in FIG. 4G.

In exemplary embodiments, when receiving a confirm signal in the first state, the display device 340 pauses the currently displayed sub-level content, or switches to a third state of displaying a list of sub-level content information. For example, the list of sub-level content information includes introduction information of sub-level contents which are arranged in order and at least one switch direction, and the introduction information further includes at least one of a channel number, a channel name, or a program name.

Figure 4H:
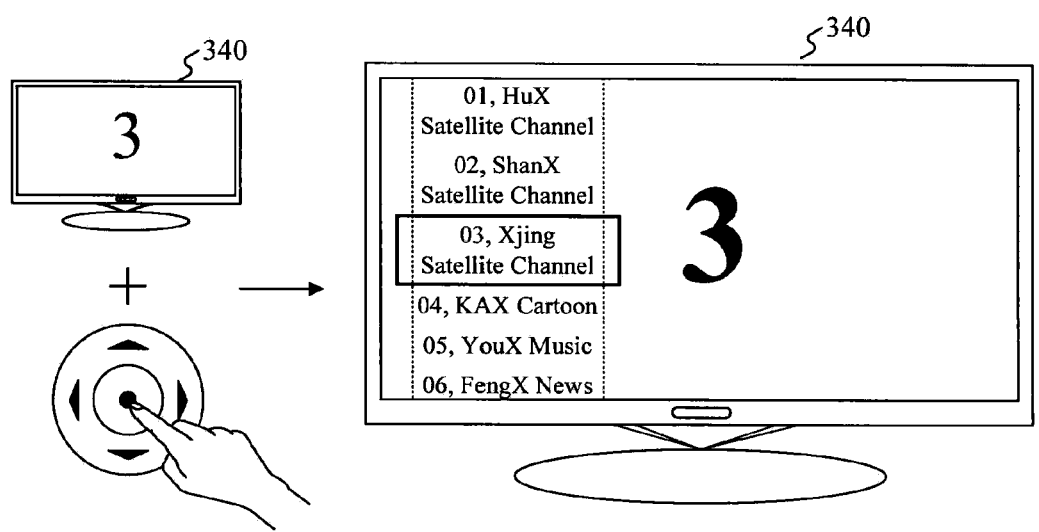

In one exemplary embodiment, the display device 340 is in the first state as shown in FIG. 2A, and the sub-level content is received from a local high definition player and, thus, can be paused. Accordingly, the display device 340 pauses the currently displayed sub-level content when receiving a confirm signal. In another embodiment, the display device 340 is in the first state, and the sub-level content is, e.g., a live broadcasting TV program and, thus, cannot be paused. Accordingly, when receiving a confirm signal, as shown in FIG. 4H, the display device 340 switches to the third state of displaying a list of sub-level content information. For example, the list of sub-level content information includes introduction information of sub-level contents which are arranged in order and at least one switch direction, and the introduction information further includes channel numbers and channel names. A difference between the list of sub-level content information and a card directory is that the list of sub-level content information is presented in the form of a list and text in the list, while the card directory is generally presented in the form of a picture and text in the picture.

In exemplary embodiments, when the display device 340 currently displays sub-level content, e.g., a local content or an online content, in the first state and receives a direction control signal of a designated direction, the display device 340 switches to a fourth state of displaying another sub-level content via a picture-in-picture window on the currently displayed sub-level content. The designated direction may be, or may not be, the predetermined direction noted above. The local content may be provided by a high definition player, a set top box, a jukebox, or a game machine connected to the display device 340 through hardware interfaces. The online content may be provided by a home computer or a remote server connected to the display device 340 through a network.

Figure 4I:
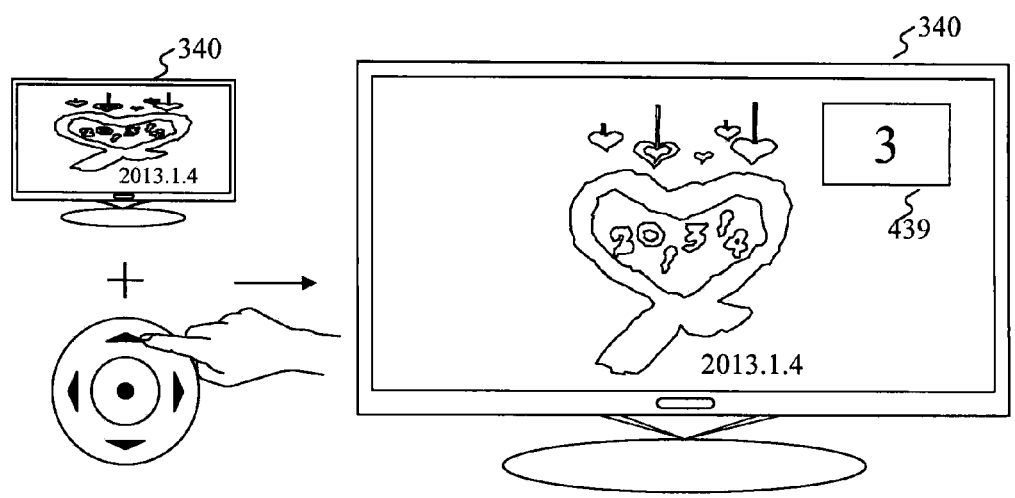

In one exemplary embodiment, the display device 340 currently displays the sub-level content in the first state, and receives the direction control signal of the designated direction. Accordingly, as shown in FIG. 4I, the display device 340 switches to the fourth state of displaying another sub-level content on channel "3" via a picture-in-picture window 439 on the currently displayed sub-level content.

Figure 4J:
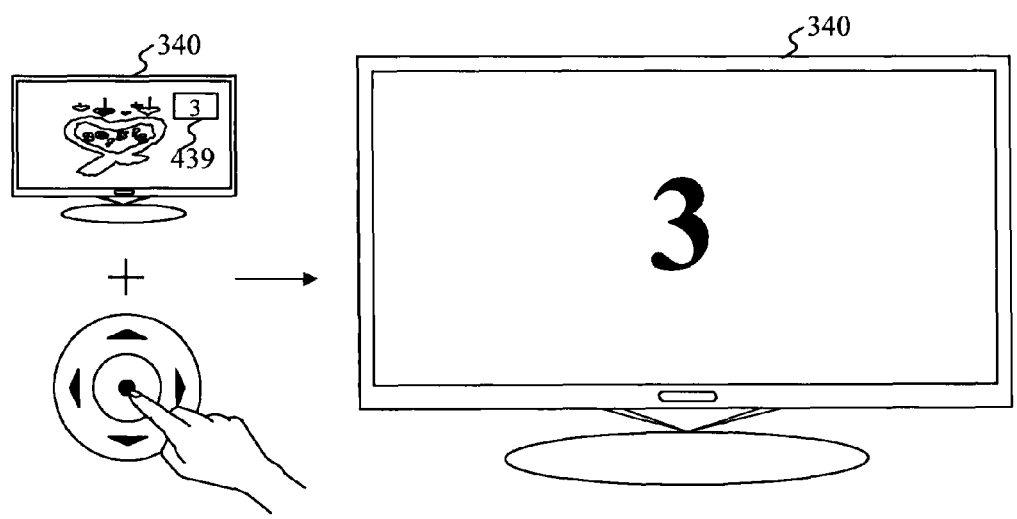

In exemplary embodiments, when the display device 340 is in the fourth state and receives a confirm signal, the display device 340 switches to a fifth state of displaying in a full-screen mode the sub-level content displayed in the picture-in-picture window. For example, when the display device 340 is in the fourth state shown in FIG. 4I and receives a confirm signal, the display device 340 switches to the fifth state of displaying in the full-screen mode the sub-level content of channel "3" displayed in the picture-in-picture window 439, as shown in FIG. 4J. In the fifth state, the sub-level content displayed in the fourth state may be paused and switched to backstage, may be shut down, or may be switched to the picture-in-picture window.

In exemplary embodiments, when the display device 340 is in the first state and receives a direction control signal not corresponding to the designated direction, and the currently displayed sub-level content in the first state is a local content or an online content, the display device 340 performs a fast forward or fast backward operation on the local content or online content. For example, when the display device 340 is in the first state and receives a direction control signal of the left direction, and the currently displayed sub-level content on the display device 340 in the first state is a local content or an online content, the display device 340 performs a fast backward operation on the local content or online content. Alternatively, if the display device 340 receives a direction control signal of the right direction, the display device 340 performs a fast forward operation on the local content or online content.

In exemplary embodiments, when the display device 340 is in the fourth state and receives a direction control signal of a designated direction, the display device 340 switches the another sub-level content displayed in the picture-in-picture window to yet another sub-level content. For example, referring to FIG. 4I, when the display device 340 is in the fourth state and receives a direction control signal of the up direction, the display device 340 switches the sub-level content of channel "3" displayed in the picture-in-picture window 439 to another sub-level content of, e.g., channel "8." Alternatively, when the display device 340 is in the fourth state and receives a direction control signal of the down direction, the display device 340 switches the sub-level content of channel "3" displayed in the picture-in-picture window 439 to another sub-level content of, e.g., channel "10."

Figure 5:
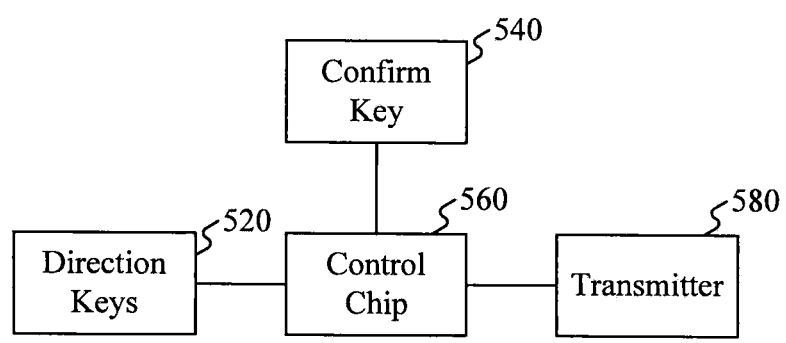
FIG. 5 is a block diagram of a remote controller, according to an exemplary embodiment.

FIG. 5 illustrates a block diagram of a remote controller 500 for controlling a display device, according to an exemplary embodiment. Referring to FIG. 5, the remote controller 500 includes a plurality of direction keys 520 respectively corresponding to different directions, a confirm key 540, a control chip 560 electrically connected to the direction keys 520 and the confirm key 540, and a transmitter 580 electrically connected to the control chip 560.

In exemplary embodiments, the control chip 560 controls the transmitter 580 to transmit a direction control signal of a corresponding direction to the display device when one of the direction keys 520 is pressed. When the direction control signal is received by the display device in a first state of displaying sub-level content without displaying a card directory and the direction control signal corresponds to a predetermined direction, the direction control signal causes the display device to switch to a second state of displaying a card directory. The card directory includes a selected card and at least one candidate card arranged in order, and at least one switch direction. When the direction control signal is received by the display device in the second state and corresponds to a switch direction, the direction control signal causes the display device to switch a candidate card in the card directory to be the selected card according to the switch direction.

In exemplary embodiments, the control chip 560 controls the transmitter 580 to transmit a confirm signal to the display device when the confirm key is pressed. When the confirm signal is received by the display device in the second state, the confirm signal causes the display device to switch to the first state of displaying sub-level content corresponding to the selected card.

In one exemplary embodiment, when the direction control signal is received by the display device in the second state and corresponds to no switch direction, the direction control signal causes the display device to switch to display another card directory, a switch direction or a card order of the another card directory being different from that of the current card directory.

In one exemplary embodiment, when the direction control signal is received by the display device in the first state and corresponds to no predetermined direction, the direction control signal causes the display device to directly switch the currently displayed sub-level content to sub-level content corresponding to another card according to the direction control signal and a predetermined card order.

In one exemplary embodiment, when the confirm signal is received by the display device in the first state, the confirm signal causes the display device to pause the currently displayed sub-level content, or causes the display device to switch to a third state of displaying a list of sub-level content information, the list of sub-level content information including introduction information of sub-level contents which are arranged in order and include at least one switch direction, the introduction information further including at least one of a channel number, a channel name, or a program name.

In one exemplary embodiment, when the direction control signal is received by the display device in the first state and corresponds to a designated direction, and the currently displayed sub-level content in the first state is a local content or an online content, the direction control signal causes the display device to switch to a fourth state of displaying another sub-level content via a picture-in-picture window on the currently displayed sub-level content. When the confirm signal is received by the display device in the fourth state, the confirm signal causes the display device to switch to a fifth state of displaying in a full-screen mode the another sub-level content displayed in the picture-in-picture window.

In exemplary embodiments, predetermined directions in the first state include at least one of the left direction and the right direction. When both the left direction and the right direction are included, the two directions correspond to card directories of different orders and/or different switch directions, respectively. Alternatively and/or additionally, the predetermined directions include at least one of the up direction and the down direction. When both the up direction and the down direction are included, the two directions correspond to card directories of different orders and/or different switch directions, respectively.

In exemplary embodiments, the card directory is one of a lateral card directory, a vertical card directory, or an array card directory. The lateral card directory includes a selected card and at least one candidate card arranged in a predetermined card order, and the switch direction of the lateral card directory includes a left direction and/or a right direction. The vertical card directory includes a selected card and at least one candidate card arranged in a predetermined card order, and the switch direction of the vertical card directory includes an up direction and/or a down direction. The array card directory includes a selected card and at least two candidate cards arranged in a predetermined card order, and the switch direction of the array card directory includes at least two directions perpendicular to each other among a left direction, a right direction, an up direction and a down direction.

In exemplary embodiments, the predetermined order is one of: an order according to a time sequence of viewing history, an order according to a number of times of being viewed, an order according to a number of times of being marked, or an order according to channel numbers of sub-level contents.

Figure 6:
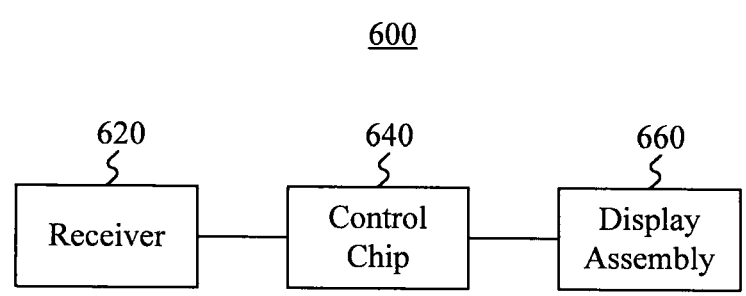
FIG. 6 is a block diagram of a display device, according to an exemplary embodiment.

FIG. 6 illustrates a block diagram of a display device 600, according to an exemplary embodiment. Referring to FIG. 6, the display device 600 includes a receiver 620, a control chip 640 electrically connected to the receiver 620, and a display assembly 660 electrically connected to the control chip 640.

In exemplary embodiments, the receiver 620 is configured to receive a direction control signal or a confirm signal transmitted by a remote controller. The direction control signal is transmitted when a direction key on the remote controller is pressed, and the confirm signal is transmitted when a confirm key on the remote controller is pressed.

In one exemplary embodiment, when the display assembly 660 is in a first state of displaying sub-level content and the receiver 620 receives the direction control signal corresponding to a predetermined direction, the control chip 640 controls the display assembly 660 to switch to a second state of displaying a card directory. For example, the card directory includes a selected card and at least one candidate card arranged in order, and at least one switch direction.

In one exemplary embodiment, when the display assembly 660 is in the second state and the receiver 620 receives the direction control signal corresponding to a switch direction, the control chip 640 controls the display assembly 660 to switch a candidate card in the card directory to be the selected card according to the switch direction.

In one exemplary embodiment, when the display assembly 660 is in the second state and the receiver 620 receives the confirm signal, the control chip 640 controls the display assembly 660 to switch to the first state of displaying sub-level content corresponding to the selected card without displaying the card directory.

In one exemplary embodiment, when the display assembly 660 is in the second state and the receiver 620 receives the direction control signal corresponding to no switch direction, the control chip 640 controls the display assembly 660 to switch to display another card directory, a switch direction or a card order of the another card directory being different from that of the current card directory.

In one exemplary embodiment, when the display assembly 660 is in the first state and the receiver 620 receives the direction control signal corresponding to no predetermined direction, the control chip 640 controls the display assembly 660 to directly switch the currently displayed sub-level content to sub-level content corresponding to another card according to the direction control signal and a predetermined card order.

In one exemplary embodiment, when the display assembly 660 is in the first state and the receiver 620 receives the confirm signal, the control chip 640 controls the display assembly 660 to pause the currently displayed sub-level content, or control the display assembly 660 to switch to a third state of displaying a list of sub-level content information, the list of sub-level content information including introduction information of sub-level contents arranged in order and at least one switch direction, the introduction information including at least one of a channel number, a channel name, or a program name.

In one exemplary embodiment, when the display assembly 660 displays sub-level content, such as a local content or an online content, in the first state, and the receiver 620 receives the direction control signal of a designated direction, the control chip 640 controls the display assembly 660 to switch to a fourth state of displaying another sub-level content via a picture-in-picture window on the currently displayed sub-level content.

In one exemplary embodiment, when the display assembly 660 is in the fourth state and the receiver 620 receives the confirm signal, the control chip 640 controls the display assembly 660 to switch to a fifth state of displaying in a full-screen mode the another sub-level content displayed in the picture-in-picture window.

In exemplary embodiments, predetermined directions in the first state include at least one of a left direction and a right direction. When both the left direction and the right direction are included, the two directions correspond to card directories of different card orders and/or different switch directions. Alternatively, the predetermined directions include at least one of an up direction and a down direction. When both the up direction and the down direction are included, the two directions correspond to card directories of different card orders and/or different switch directions.

In exemplary embodiments, the card directory may be one of a lateral card directory, a vertical card directory, or an array card directory. The lateral card directory includes one selected card and at least one candidate card arranged in a predetermined card order, and the switch direction of the lateral card directory includes a left direction and/or a right direction. The vertical card directory includes one selected card and at least one candidate card arranged in a predetermined card order, and the switch direction of the vertical card directory includes an up direction and/or a down direction. The array card directory includes one selected card and at least two candidate cards arranged in a predetermined card order, and the switch direction of the array card directory includes at least two directions perpendicular to each other among a left direction, a right direction, an up direction and a down direction.

In exemplary embodiments, the predetermined card order may be one of an order according to a time sequence of watching history, an order according to a number of times of being viewed, an order according to a number of times of being marked, or an order according to channel numbers of sub-level contents.

Figure 7:
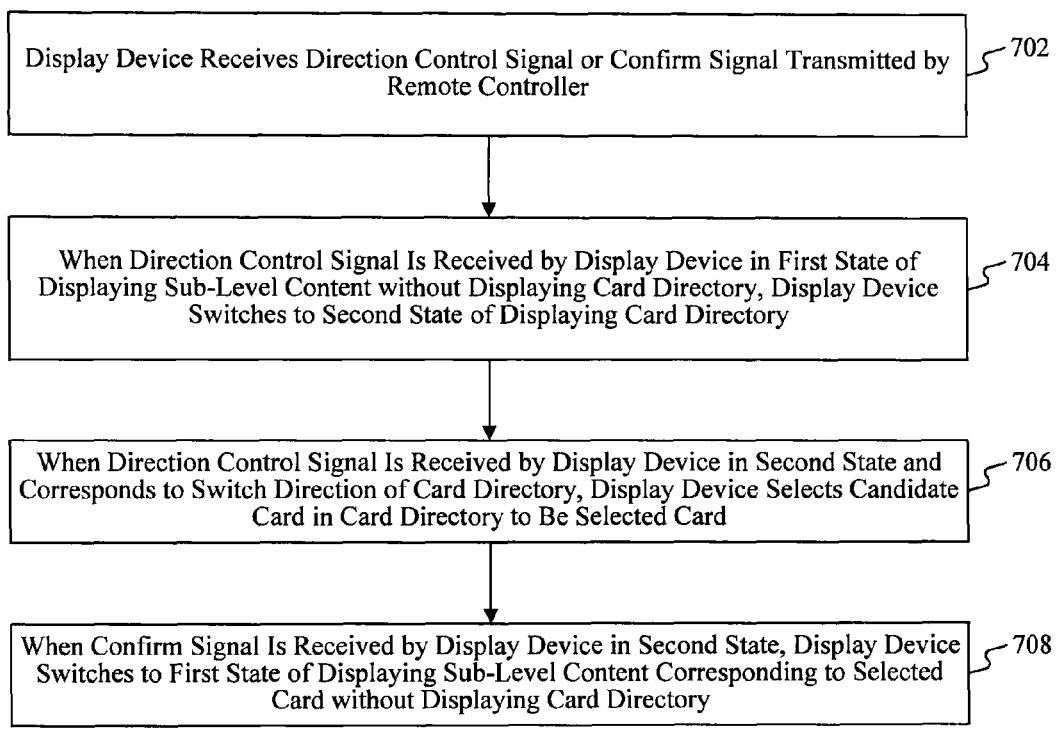
FIG. 7 is a flowchart of a remote control method, according to an exemplary embodiment.

FIG. 7 is a flowchart of a remote control method 700, according to an exemplary embodiment. The remote control method 700 can be used in any of the display devices described above. Referring to FIG. 7, the remote control method 700 includes the following steps.

In step 702, the display device receives a direction control signal or a confirm signal transmitted by a remote controller. The remote controller transmits the direction control signal when a direction key on the remote controller is pressed, and transmits the confirm signal when a confirm key on the remote controller is pressed.

In step 704, when the direction control signal is received by the display device in a first state of displaying sub-level content without displaying a card directory, the display device switches to a second state of displaying a card directory. For example, the card directory includes a selected card and at least one candidate card arranged in order, and at least one switch direction.

In step 706, when the direction control signal is received by the display device in the second state and corresponds to a switch direction of the card directory, the display device selects a candidate card in the card directory to be the selected card according to the switch direction.

In step 708, when the confirm signal is received by the display device in the second state, the display device switches to the first state of displaying sub-level content corresponding to the selected card without displaying the card directory.

Figure 8:
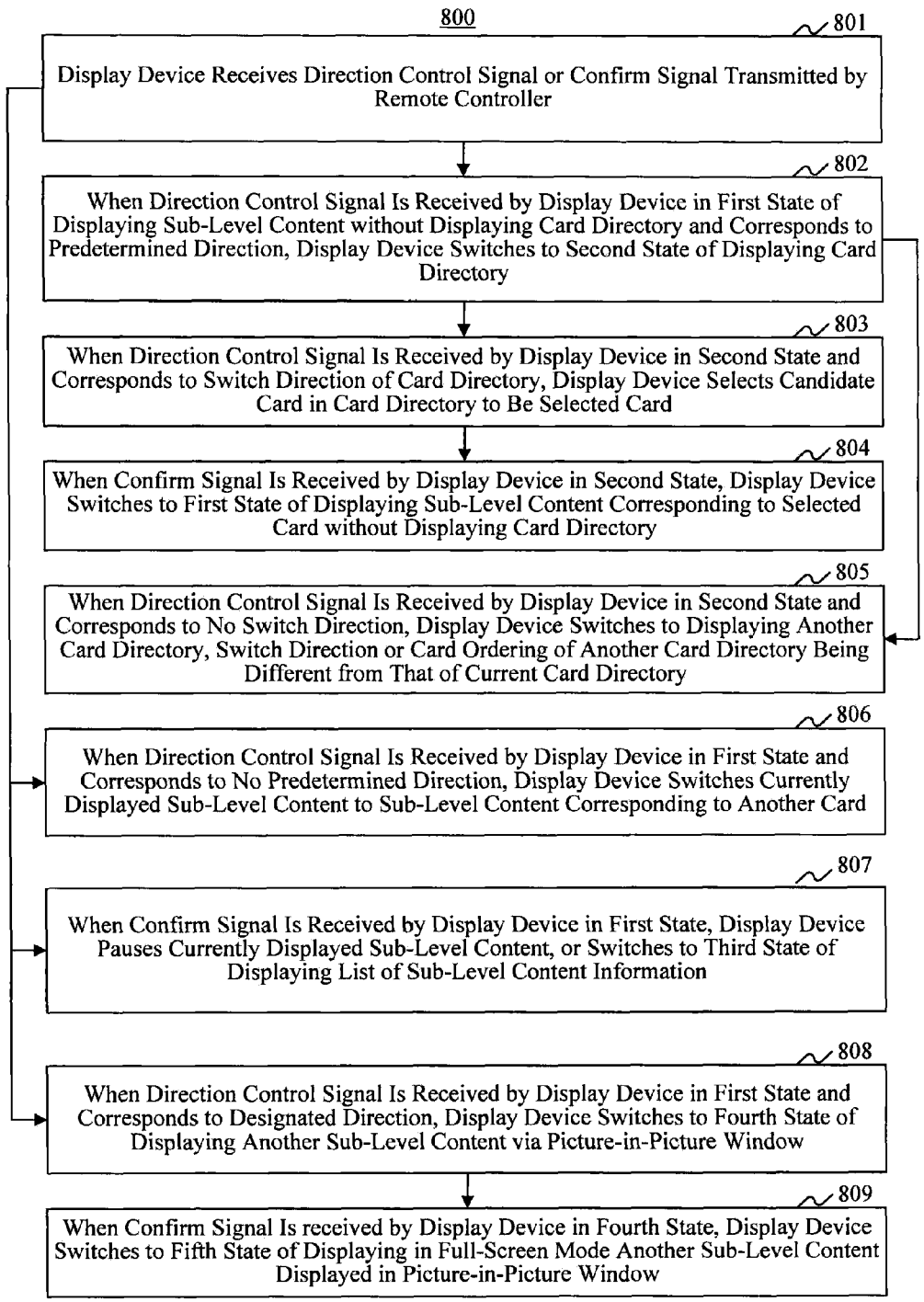
FIG. 8 is a flowchart of a remote control method, according to an exemplary embodiment.

FIG. 8 illustrates a flowchart of a remote control method 800, according to an exemplary embodiment. The remote control method 800 can be used in any of the above described display devices. Referring to FIG. 8, the remote control method 800 includes the following steps.

In step 801, the display device receives a direction control signal or a confirm signal transmitted by a remote controller. For example, the direction control signal is transmitted when a direction key on the remote controller is pressed, and the confirm signal is transmitted when a confirm key on the remote controller is pressed. Also for example, the direction control signal may, or may not, correspond to a predetermined direction, which may be a switch direction for a card directory.

In step 802, when the direction control signal is received by the display device in a first state of displaying sub-level content without displaying a card directory and corresponds to the predetermined direction, the display device switches to a second state of displaying a card directory. For example, the card directory includes a selected card and at least one candidate card arranged in order, and at least one switch direction.

In exemplary embodiments, predetermined directions include at least one of a left direction and a right direction and, when both the left direction and the right direction are included, the two directions correspond to card directories of different orders and/or different switch directions, respectively. Alternatively, the predetermined directions include at least one of an up direction and a down direction and, when both the up direction and the down direction are included, the two directions correspond to card directories of different orders and/or different switch directions, respectively. The card directory may be one of a lateral card directory, a vertical card directory, or an array card directory, as described above.

In step 803, when the direction control signal is received by the display device in the second state and corresponds to a switch direction of the card directory, the display device selects a candidate card in the card directory to be the selected card according to the switch direction.

In step 804, when the confirm signal is received by the display device in the second state, the display device switches to the first state of displaying sub-level content corresponding to the selected card without displaying the card directory.

In step 805, when the direction control signal is received by the display device in the second state and corresponds to no switch direction, the display device switches to displaying another card directory, a switch direction or a card order of the another card directory being different from that of the current card directory.

In step 806, when the direction control signal is received by the display device in the first state and corresponds to no predetermined direction, the display device switches the currently displayed sub-level content to sub-level content corresponding to another card according to the direction control signal and a predetermined card order.

In step 807, when the confirm signal is received by the display device in the first state, the display device pauses the currently displayed sub-level content, or switches to a third state of displaying a list of sub-level content information, the list of sub-level content information including introduction information of sub-level contents which are arranged in order and at least one switch direction, and the introduction information further including at least one of a channel number, a channel name, or a program name.

In step 808, when the direction control signal is received by the display device displaying the sub-level content, including one of a local content or an online content, in the first state and corresponds to a designated direction, the display device switches to a fourth state of displaying another sub-level content via a picture-in-picture window on the currently displayed sub-level content.

In step 809, when the confirm signal is received by the display device in the fourth state, the display device switches to a fifth state of displaying in a full-screen mode the another sub-level content displayed in the picture-in-picture window.

The person skilled in the art would understand that all or part of the steps for realizing the above embodiments may be accomplished by hardware, software, a combination thereof. The software may be stored in a computer readable storage medium, such as a read-only memory, a magnetic disk, an optical disk, etc.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A remote control system, comprising:
   a remote controller including one or more direction keys respectively corresponding to different directions and a confirm key; and
   a display device controlled by the remote controller;
   wherein:
   the remote controller is configured to transmit a direction control signal of a corresponding direction to the display device when one of the direction keys is pressed;

the display device is configured to, when the direction control signal is received by the display device in a first state of displaying sub-level content without displaying a card directory and corresponds to a predetermined direction, switch to a second state of displaying a card directory, the card directory including one selected card and at least one candidate card arranged in order, and at least one switch direction;

the display device is further configured to, when the direction control signal is received by the display device in the second state and corresponds to a switch direction of the card directory, select a candidate card in the card directory to be the selected card according to the switch direction;

the remote controller is further configured to transmit a confirm signal to the display device when the confirm key is pressed; and the display device is configured to, when receiving the confirm signal in the second state, switch to the first state of displaying sub-level content corresponding to the selected card without displaying the card directory.

2. The remote control system according to claim 1, wherein:
the display device is further configured to, when the direction control signal is received by the display device in the second state and corresponds to no switch direction, switch to displaying another card directory, a switch direction or a card order of the another card directory being different from that of the current card directory.

3. The remote control system according to claim 1, wherein:
the display device is further configured to, when the direction control signal is received by the display device in the first state and corresponds to no predetermined direction, directly switch the currently displayed sub-level content to sub-level content corresponding to another card according to the direction control signal and a predetermined card order.

4. The remote control system according to claim 1, wherein:
the display device is further configured to, when receiving the confirm signal in the first state, pause the currently displayed sub-level content, or switch to a third state of displaying a list of sub-level content information, the list of sub-level content information including introduction information of sub-level contents, the introduction information further including at least one of a channel number, a channel name, or a program name.

5. The remote control system according to claim 1, wherein:
the display device is configured to, when the direction control signal is received by the display device displaying the sub-level content, including one of a local content or an online content, in the first state, and corresponds to a designated direction, switch to a third state of displaying another sub-level content via a picture-in-picture window on the currently displayed sub-level content; and
the display device is configured to, when receiving the confirm signal in the third state, switch to a fourth state of displaying in a full-screen mode the another sub-level content displayed in the picture-in-picture window.

6. The remote control system according to claim 1, wherein:
the predetermined direction includes at least one of a left direction and a right direction and, when both the left direction and the right direction are included, the two directions correspond to card directories of different orders and/or different switch directions; or
the predetermined direction comprises at least one of an up direction and a down direction and, when both the up direction and the down direction are included, the two directions correspond to card directories of different card orders and/or different switch directions.

7. The remote control system according to claim 1, wherein:
the card directory is one of a lateral card directory, a vertical card directory, or an array card directory;
the lateral card directory includes one selected card and at least one candidate card arranged in a first predetermined order, and the switch direction of the lateral card directory includes at least one of a left direction or a right direction;
the vertical card directory includes one selected card and at least one candidate card arranged in a second predetermined order, and the switch direction of the vertical card directory includes an up direction and/or a down direction; and
the array card directory includes one selected card and at least two candidate cards arranged in a third predetermined order, and the switch direction of the array card directory includes at least two directions perpendicular to each other among the left direction, the right direction, the up direction, and the down direction.

8. The remote control system according to claim 7, wherein the first, second, and third predetermined orders comprise at least one of:
an order according to a time sequence of viewing history;
an order according to a number of times of being viewed;
an order according to a number of times of being marked; or
an order according to channel numbers of sub-level contents.

9. A remote controller for controlling a display device, comprising:
one or more direction keys respectively corresponding to different directions and a confirm key;
a control chip electrically connected to the one or more direction keys and the confirm key; and
a transmitter electrically connected to the control chip;
wherein the control chip is configured to control the transmitter to transmit a direction control signal of a corresponding direction to the display device to:
when the direction control signal is received by the display device in a first state of displaying sub-level content and corresponds to a predetermined direction, cause the display device to switch to a second state of displaying a card directory, the card directory including one selected card and at least one candidate card arranged in order, and at least one switch direction; and
when the direction control signal is received by the display device in the second state and corresponds to a switch direction of the card directory, cause the display device to select a candidate card in the card directory to be the selected card according to the switch direction; and
the control chip is further configured to control the transmitter to transmit a confirm signal to the display device to, when the confirm signal is received by the display device in the second state, switch the display device to the first state of displaying sub-level content corresponding to the selected card.

10. The remote controller according to claim 9, wherein:
the control chip is further configured to control the transmitter to transmit the direction control signal to, when the direction control signal is received by the display device in the second state and corresponds to no switch direction, cause the display device to switch to display another card directory, a switch direction or a card order of the another card directory being different from that of the current card directory.

11. The remote controller according to claim 9, wherein:
the control chip is further configured to control the transmitter to transmit the direction control signal to, when the direction control signal is received by the display device in the first state and corresponds to no predetermined direction, cause the display device to directly switch the currently displayed sub-level content to sub-level content corresponding to another card according to the direction control signal and a predetermined card order.

12. The remote controller according to claim 9, wherein:
the control chip is further configured to control the transmitter to transmit the confirm signal to, when the confirm signal is received by the display device in the first state, cause the display device to pause the currently displayed sub-content, or cause the display device to switch to a third state of displaying a list of sub-level content information, the list of sub-level content information including introduction information of sub-level contents, the introduction information further including at least one of a channel number, a channel name, or a program name.

13. The remote controller according to claim 9, wherein:
the control chip is further configured to control the transmitter to transmit the direction control signal to, when the direction control signal is received by the display device in the first state and corresponds to a designated direction, cause the display device to switch to a third state of displaying another sub-level content via a picture-in-picture window on the currently displayed sub-level content; and
the control chip is further configured to control the transmitter to transmit the confirm signal to, when the confirm signal is received by the display device in the third state, cause the display device to switch to a fourth state of displaying in a full-screen mode the another sub-level content displayed in the picture-in-picture window.

14. A display device, comprising:
a receiver;
a control chip electrically connected to the receiver; and
a display assembly electrically connected to the control chip;
wherein:
the receiver is configured to receive a direction control signal or a confirm signal transmitted by a remote controller;
the control chip is configured to, when the display assembly is in a first state of displaying sub-level content without displaying a card directory and the direction control signal received by the receiver corresponds to a predetermined direction, control the display assembly to switch to a second state of displaying a card directory, the card directory including one selected card and at least one candidate card arranged in order, and at least one switch direction;
the control chip is further configured to, when the display assembly is in the second state and the direction control signal received by the receiver corresponds to a switch direction of the card directory, control the display assembly to select a candidate card in the card directory to be the selected card according to the switch direction; and
the control chip is further configured to, when the display assembly is in the second state and the receiver receives the confirm signal, control the display assembly to switch to the first state of displaying sub-level content corresponding to the selected card without displaying the card directory.

15. The display device according to claim 14, wherein:
the control chip is further configured to, when the display assembly is in the second state and the direction control signal received by the receiver corresponds to no switch direction, control the display assembly to switch to displaying another card directory, a switch direction or a card order of the another card directory being different from that of the current card directory.

16. The display device according to claim 14, wherein:
the control chip is configured to, when the display assembly is in the first state and the direction control signal received by the receiver corresponds to no predetermined direction, control the display assembly to directly switch the currently displayed sub-level content to sub-level content corresponding to another card according to the direction control signal and a predetermined card order.

17. The display device according to claim 14, wherein:
the control chip is configured to, when the display assembly is in the first state and the receiver receives the confirm signal, control the display assembly to pause the currently displayed sub-level content, or control the display assembly to switch to a third state of displaying a list of sub-level content information, the list of sub-level content information including introduction information of sub-level contents, the introduction information further including at least one of a channel number, a channel name, or a program name.

18. The display device according to claim 14, wherein:
the control chip is configured to, when the display assembly displays the sub-level content, including one of a local content or an online content, in the first state and the direction control signal received by the receiver corresponds to a designated direction, control the display assembly to switch to a third state of displaying another sub-level content via a picture-in-picture window on the currently displayed sub-level content; and
the control chip is configured to, when the display assembly is in the third state and the receiver receives the confirm signal, control the display assembly to switch to a fourth state of displaying in a full-screen mode the another sub-level content displayed in the picture-in-picture window.

19. A method for a display device to be controlled by a remote controller, comprising:
receiving a direction control signal or a confirm signal transmitted by the remote controller;
when the direction control signal is received by the display device in a first state of displaying sub-level content without displaying a card directory and corresponds to a predetermined direction, switching to a second state of displaying a card directory, the card directory including one selected card and at least one candidate card arranged in order, and at least one switch direction;
when the direction control signal is received by the display device in the second state and corresponds to a switch direction of the card directory, selecting a candidate card in the card directory to be the selected card according to the switch direction; and when the confirm signal is received by the display device in the second state, switching to the first state of displaying sub-level content corresponding to the selected card.

20. The remote control method according to claim 19, further comprising:

when the direction control signal is received by the display device in the second state and corresponds to no switch direction, switching to displaying another card directory, a switch direction or a card order of the another card directory being different from that of the current card directory.

21. The remote control method according to claim 19, further comprising:

when the direction control signal is received by the display device in the first state and corresponds to no predetermined direction, directly switching the currently displayed sub-level content to sub-level content corresponding to another card according to the direction control signal and a predetermined card order.

22. The remote control method according to claim 19, further comprising:

when the confirm signal is received by the display device in the first state, pausing the currently displayed sub-level content, or switching to a third state of displaying a list of sub-level content information, the list of sub-level content information including introduction information of sub-level contents, the introduction information further including at least one of a channel number, a channel name, or a program name.

23. The remote control method according to claim 19, further comprising:

when the direction control signal is received by the display device displaying the sub-level content, including one of a local content or an online content, in the first state and corresponds to a designated direction, switching to a third state of displaying another sub-level content via a picture-in-picture window on the currently displayed sub-level content; and when the confirm signal is received by the display device in the third state, switching to a fourth state of displaying in a full-screen mode the another sub-level content displayed in the picture-in-picture window.

* * * * *